(12) United States Patent
Aruhan et al.

(10) Patent No.: US 10,679,286 B1
(45) Date of Patent: Jun. 9, 2020

(54) SYSTEMS AND METHODS FOR INTELLIGENT INCOME VERIFICATION TO IMPROVE LOAN CONTRACT FUNDING

(71) Applicant: Capital One Services, LLC, McLean, VA (US)

(72) Inventors: Fnu Aruhan, McLean, VA (US); Jyothsna Bhima, Lewisville, TX (US); Kushal Pillarisetty, The Colony, TX (US); Saira Zaman, Frisco, TX (US); Hilda Huang, Plano, TX (US); Landon Nehmer, McKinney, TX (US); Vijay Pasam, McLean, VA (US); Kartheek Yelamarthi, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/415,558

(22) Filed: May 17, 2019

(51) Int. Cl.
    *G06Q 40/00* (2012.01)
    *G06Q 40/02* (2012.01)
    (Continued)

(52) U.S. Cl.
    CPC ....... *G06Q 40/025* (2013.01); *G06Q 30/0283* (2013.01); *G06Q 50/163* (2013.01)

(58) Field of Classification Search
    CPC . G06Q 40/025; G06Q 30/0283; G06Q 50/163
    See application file for complete search history.

(56) References Cited

U.S. PATENT DOCUMENTS

| 7,451,095 B1 | 11/2008 | Bradley et al. |
| 7,653,592 B1 * | 1/2010 | Flaxman ................ G06Q 40/00 705/35 |

(Continued)

FOREIGN PATENT DOCUMENTS

| KR | 20140076983 A | * | 6/2014 | |
| WO | WO-2004061561 A2 | * | 7/2004 | .......... G06Q 20/382 |
| WO | WO-2007064617 A2 | * | 6/2007 | .......... G06Q 40/025 |

OTHER PUBLICATIONS

Anonymous, "Mortgage Pricing Adjustments," https://www.thetruthaboutmortgage.com/mortgage-pricing-adjustments, (Year: 2006).*

(Continued)

*Primary Examiner* — Alexander G Kalinowski
*Assistant Examiner* — William B. Bunker
(74) *Attorney, Agent, or Firm* — Finnegan, Henderson, Farabow, Garrett & Dunner, LLP

(57) ABSTRACT

Disclosed embodiments provide systems, methods, and devices for verifying income of a loan applicant. The embodiments comprise receiving an application for a loan for an applicant. The method further comprises approving the application based on a first income and requesting second income data specifying a second income. The method comprises receiving the second income data, and requesting, third income data specifying a third income. Further, the method comprises receiving the third income data. The method compares the first income to the third income and determines, if the second income is less than a predetermined portion of the third income, whether the approved application should be modified, based on at least the first, second, and third incomes. The method comprises confirming the first income, if the second income is at least equal to the predetermined portion of the third income. The method comprises notifying the applicant of the determination or confirmation.

14 Claims, 7 Drawing Sheets

(51) Int. Cl.
*G06Q 50/16* (2012.01)
*G06Q 30/02* (2012.01)

(56) References Cited

U.S. PATENT DOCUMENTS

| | | | | |
|---|---|---|---|---|
| 8,015,091 | B1* | 9/2011 | Ellis | G06Q 40/00 |
| | | | | 705/35 |
| 8,401,868 | B1* | 3/2013 | Bradley | G06Q 40/00 |
| | | | | 705/1.1 |
| 9,147,042 | B1 | 9/2015 | Haller et al. | |
| 9,684,905 | B1* | 6/2017 | Haller | G06F 16/9535 |
| 2006/0155639 | A1* | 7/2006 | Lynch | G06Q 40/00 |
| | | | | 705/38 |
| 2007/0055621 | A1 | 3/2007 | Tischler et al. | |
| 2007/0124235 | A1* | 5/2007 | Chakraborty | G06Q 40/025 |
| | | | | 705/38 |
| 2015/0052033 | A1* | 2/2015 | Boyanov | G06Q 40/123 |
| | | | | 705/31 |
| 2015/0213550 | A1* | 7/2015 | Boyanov | G06Q 40/025 |
| | | | | 705/38 |
| 2016/0086263 | A1* | 3/2016 | Weinflash | G06Q 40/025 |
| | | | | 705/38 |
| 2016/0104238 | A1* | 4/2016 | Loganathan | G06Q 40/025 |
| | | | | 705/35 |
| 2016/0140654 | A1* | 5/2016 | Bhat | G06Q 40/025 |
| | | | | 705/7.26 |
| 2017/0337625 | A1 | 11/2017 | Rosenblatt et al. | |
| 2017/0337628 | A1* | 11/2017 | Arnall | G06Q 50/16 |
| 2018/0204280 | A1* | 7/2018 | Painter | G06F 15/76 |
| 2019/0066203 | A1* | 2/2019 | Smith | G06Q 40/025 |
| 2019/0080397 | A1* | 3/2019 | Monaco | G06Q 40/025 |

OTHER PUBLICATIONS

Anonymous, "When and why we verify income and income source," www.lendingclub.com/investing/investor-education/income-verification. (Year: 2018).*

Anonymous, "Now it's easier for you to understand and take action on the DU validation service messages," Fannie Mae (Year: 2019).*

* cited by examiner

SYSTEMS AND METHODS FOR INTELLIGENT INCOME VERIFICATION TO IMPROVE LOAN CONTRACT FUNDING

TECHNICAL FIELD

The present disclosure relates generally to the field of loan application processing. More specifically, and without limitation, this disclosure relates to systems and methods for using processes to compare applicant stated income with verified income and determining associated risk factors, loan deal structure components, and contract terms. More specifically, and without limitation, this disclosure relates to systems and methods for verifying income of a loan applicant, as well as, systems and methods for monitoring an automated income verification process for a population of applicants.

BACKGROUND

Financial service providers ("FSP") approve loan applications and fund loans for applicants. In order to cover the loan investment risk, FSPs request documents for verifying loan deal components. The requested documents are funding requirements, and often are called stipulations, that vary from loan type to type (e.g., home, auto, business, etc. loans) as well as from applicant to applicant. Stipulations may include document requests pertaining to applicant employment, residence, phone verification, etc. Stipulations, for any loan type, are applicant specific and may illustrate the financial situation of the applicant. For example, an applicant's income is one of the most important funding stipulations for any type of loan, and it is considered a reliable factor in summarizing an applicant's financial capabilities in repaying the loan, or alternatively, how risky a particular loan may be for the FSP. Alternatively, other stipulations may include indicators of the applicant's financial situation such as total assets or credit score.

In particular, FSPs validate applicant's stated income from the loan application by comparing the stated income with data provided by third party income verification services. If the verified income is greater than the stated income then the income is validated. However, not every application type or applicant may have documentation proving a verified income greater than the stated income. In such situations, the FSPs use resources, including third party verifications, application processing time, additional communication with vendors, and manual checks, often requiring manual review of numerous financial documents, to determine whether applicant's actual income is, or is close enough, to the stated income to justify the investment risk. The riskier the investment, whether due to market factors or due to a lack of validated income, the higher the number of stipulations that an FSP may request an applicant to submit.

The entire loan application process from applicant's initial request for a loan to finalizing the loan deal terms with a contract offer is time consuming and tedious for the average applicant. The process becomes even more burdensome for sub-prime and near-prime applicants due to increased stipulation requirements, which in turn require additional processing of documentation from the FSPs. Validation of income is a critical aspect in loan application funding, and the current systems validate income through manual processes.

One solution, described herein, to optimize the loan application processes includes systems and methods for dynamically calculating deal terms twice, once with a first stated income, and next with a verified income, and determining if the income is valid based on several algorithms. This solution factors various tolerances and imperative factors such as the application type and types of financial documents which becomes complex for a group of multiple applicants. By optimizing the income validation, FSPs may increase the amount of money loaned (i.e. cashout) for low risk applicants and further minimize the burden associated with funding loans to sub- and near-prime applicants. Further, the loan application process may be further optimized through the implementation of a thorough monitoring process.

The present disclosure provides systems, methods, and devices to further improve the funding of loan applications through algorithms that optimize the income validation process. By comparing the stated income to verified income, from varying sources, these systems, methods, and devices increase the amount of approved loans and loan contract offers.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of income verification for a loan application, the disclosed embodiments are not limited to any particular industry or product.

Disclosed embodiments provide systems, methods, devices for verifying income of a loan applicant. The embodiments comprise receiving an application for a loan from an applicant, the application stating a first income. The method further comprises approving the application based on the first income and requesting, from the applicant, second income data specifying a second income. The method also comprises receiving the second income data, and requesting, from a third party, third income data specifying a third income. Further, the method comprises receiving the third income data. The method comprises comparing the second income to the third income and determining whether the approved application should be modified, based on at least the first, second, and third incomes, when the second income is less than a predetermined portion of the third income. And the method comprises confirming the first income, when the second income is at least equal to the predetermined portion of the third income. The method comprises notifying the applicant of the determination or confirmation.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
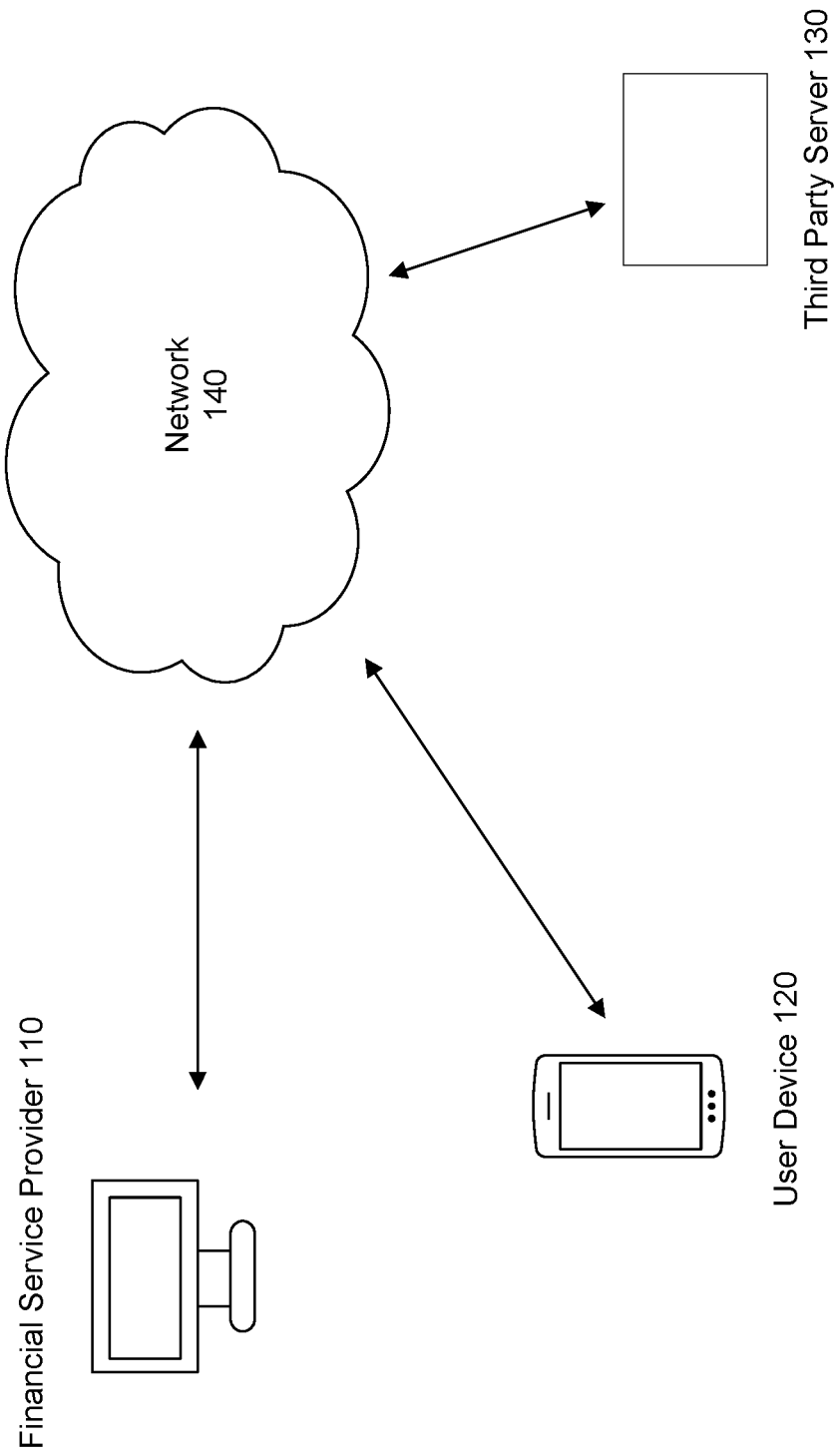
FIG. 1 is a block diagram illustrating an exemplary system 100 for verifying application documentation.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The disclosed embodiments relate to systems, devices, and methods for verifying income for applicants. Embodiments of the present disclosure may be implemented using at least one processor and at least one memory, as described below. In some embodiments, the at least one processor may comprise a microprocessor, such as a central processing unit (CPU), a graphics processing unit (GPU), or other electronic circuitry capable of carrying out the instructions of a computer program by performing the operations specified by the instructions. Alternatively or additionally, the at least one processor may comprise one or more special-purpose devices built according to embodiments of the present disclosure using suitable circuit elements, e.g., one or more application-specific integrated circuits (ASICs), field-programmable gate arrays (FPGAs), or the like. In some embodiments, the at least one memory may comprise a volatile memory, such as random access memory (RAM), a non-volatile memory, such as a hard disk drive, a flash memory, or the like, or any combination thereof.

The disclosed embodiments are directed to systems, devices, and methods for funding loan applications by verifying funding documents. A computer-executed software application ("app") may be provided by a financial service provider ("FSP"). An FSP may be, for example, a bank, a credit card company, an investment company, or other entity which handles financial transactions, including loans, for individuals and/or merchants. Financial transactions may include, for example, payment for a user purchase of products, services, real estate, etc.

Additionally, financial service providers may approve loan applications and fund loans for applicants. The loans generally may have funding requirements, called stipulations, which may vary from loan type to type (e.g., home, auto, business, etc. loans) as well as from applicant to applicant. Stipulations, for any loan type, may be applicant specific and may illustrate the financial situation of the applicant. For example, an applicant's income may be one of the most important funding stipulations for any type of loan. Applicant's income may be considered a reliable factor in summarizing an applicant's financial capabilities in repaying the loan, or alternatively, in determining how risky a particular loan may be for the FSP. Additionally, financial service companies may validate the stipulated data, such as applicant's income, by requesting additional documentation evidencing the data. The stipulated data verification may ensure applicant's compliance with the terms of the loan, mitigates risks, and may provide applicant satisfaction.

During the loan application process, the FSPs may gather initial information from the applicant regarding the type of loan and information specific to the applicant. For example, an applicant may state his or her income and/or the applicant may provide verified income. Alternatively, the FSP may acquire verified income data from third party services. Stated income refers to applicant's self reported income, whereas, verified income refers to income cross-referenced using financial records. Several third party services, such as TALX, Equifax, Experian, etc., provide income verification, although other third parties are also contemplated. Income may be verified through various types of "income data" such as information and types of forms. The types of verifiable income information may consist of, for example, wages and salaries, including base and overtime rates, bonuses and incentive payments; tips, gratuities, and self-employment funds; income maintenance, Aid to Families with Dependent Children ("AFDC"), welfare, Social Security; unemployment and workers compensation; child support payments; interest and dividends; asset reporting; child care expenses; medical expenses; housing expenses; etc. And, the types of verifiable income forms may consist of document review, third party written verification, or third party oral verification. For instance, these forms may include pay stubs, earnings statements, W-2 forms, notarized statement from form 1040, copy of check issued by government agency, award letters signed by government agency, copy of court furnished payment records, copy of divorce decree, income tax return, dividend statement from bond holder or stock company, receipts, records of insurance payment, etc.; or alternatively, the third party services may verify stated incomes via written or verbal confirmation.

The FSPs may further determine the loan deal (i.e. contract) terms based on the stipulations and deal structure components. The components are loan specific and detail the finer factors in the loan calculus. Deal components (i.e. pricing data) for an auto loan may include information on the use of the loan, for example, the vehicle being financed, the vehicle sales price, any down payment, a trade-in value, the federal interest rate, TT&L (tax, title and licensing fees), any miscellaneous deal fees, Guaranteed Auto Protection (GAP) insurance, service contract, maintenance contract amounts, the total financing amount, etc. On the other hand, the deal terms (i.e. deal parameters) themselves may relate to the loan, such as the annual percentage rate (APR), the loan term, monthly payments, etc. Verification, or rather lack of verification, of the stipulations may cause an adjustment of the deal terms.

FSPs may further adjust the loan deal terms due to the deal structure risk, and/or the applicant risk, both of which may contribute to the deal pricing. The FSP may determine a risk factor for the deal structure itself. For example, the loan amount may be abnormally high or the interest rate may be significantly low, etc. Similarly, the FSP may further determine a risk factor for the applicant. For example, the verified income may be significantly lower than the stated income, or the applicant's FICO credit score may be low, etc. Additionally, the FSP may further categorize the various risks and group them into bands. Collectively, the FSP may determine that the received applicant stipulations do not support the original deal structure (e.g. the verified income is substantially below the stated income such that the applicant drops into a riskier band); thus, the FSP may adjust the deal components (e.g. alter the interest rate) before finalizing the loan contract.

As previously stated, the entire loan application process from applicant's initial submission to finalizing the loan deal terms with a contract offer is time consuming and tedious for the average applicant. The discussed embodiments optimize the FSP and applicant processes by dynamically calculating deal terms twice, once with a first stated income, and second with a verified income, and determine if the income is valid based on several algorithms. These embodiments factor various tolerances and imperative factors such as the application type and types of financial documents which becomes complex for a group of multiple applicants. Additionally, these embodiments describe methods and processes for increasing cashout and minimize the funding burden.

FIG. 1 is a block diagram illustrating an exemplary system 100 for verifying loan application documentation. System 100 may be used to verify any stipulation document consistent with disclosed embodiments. System 100 may include a financial service provider 110, a user device 120, and a third party server 130. In some exemplary embodiments, as shown in FIG. 1, each component of system 100 may be connected to a network 140. However, in other embodiments components of system 100 may be connected directly with each other, without network 140. It is also contemplated that some components of system 100 may be connected to each other via network 140, while others may be connected to each other, without network 140.

Financial Service Provider 110 may be, for example, a bank, a credit card company, an investment company, or other entity which handles financial transactions such as loans for applicants. FSP 110 may operate at least one server. The server may be a computer-based system including computer system components, desktop computers, workstations, tablets, hand held computing devices, memory devices, and/or internal network(s) connecting the components. The server may include one or more processors configured to execute software stored as instructions in an associated memory.

User device 120 may include one or more computing devices configured to perform operations consistent with disclosed embodiments. For example, user device 120 may include at least one of a desktop computer, a laptop, a server, a mobile device (e.g., tablet, smart phone, etc.), a gaming device, a wearable computing device, or other type of computing device. User device 120 may include one or more processors configured to execute software stored as instructions in an associated memory. User device 120 may implement software to perform Internet-related communication and content display processes. For instance, user device 120 may execute browser software that generates and displays interfaces, including content, on a display device included in, or connected to, user device 120. User device 120 may execute applications that may allow user device 120 to communicate with components over network 140, and generate and display content in interfaces via a display device included in user device 120. The disclosed embodiments are not limited to any particular configuration of user device 120. For instance, user device 120 may be a mobile device that stores and executes mobile applications that interact with network 140 to perform aspects of the disclosed embodiments, such as providing loan application documentation. In certain embodiments, user device 120 may be configured to execute software instructions relating to location services, such as GPS locations. For example, user device 110 may be configured to determine a geographic location and provide location data and time stamp data corresponding to the location data. In yet other embodiments, user device 120 may capture video and/or images.

Third party server 130 may communicate with at least one of FSP 110, and user device 120 directly and/or via network 140. Third party server 130 may be associated with a third party. The third party may be, for example, a bank other than FSP 110, a credit reporting agency, a social network company, a rating company, a survey company, a financial document verification service, or any other suitable financial document verification source. Third party server 130 may provide information or data to at least one of FSP 110 and user device 120. For example, in some embodiments, third party server 130 may send applicant income verification data about applicant to user device 120 and/or FSP 110. Third party server 130 may include one or more processors configured to execute software stored as instructions in an associated memory.

Network 140 may be any type of network configured to provide communications between components of system 100. For example, network 140 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 may communicate through network 140. In various embodiments, one or more components of system 100 may communicate directly through one or more dedicated communication links.

Additionally, components of system 100 may further include one or more databases. These databases may include one or more computing devices configured to provide financial data to components of system 100. In some aspects, such financial data may include, for example, applicant information, information about product, service, or real estate being purchased with loan, information about the entity providing the loan, information about the entity providing the product, and information about third parties. These databases may include, for example, one or more Oracle™ databases, Sybase™ databases, or other relational databases or non-relational databases, such as Hadoop™ sequence files, HBase™, or Cassandra™. Databases may include computing components (e.g., database management system, database server, etc.) configured to receive and process requests for data stored in memory devices of the database(s) and to provide data from the database(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
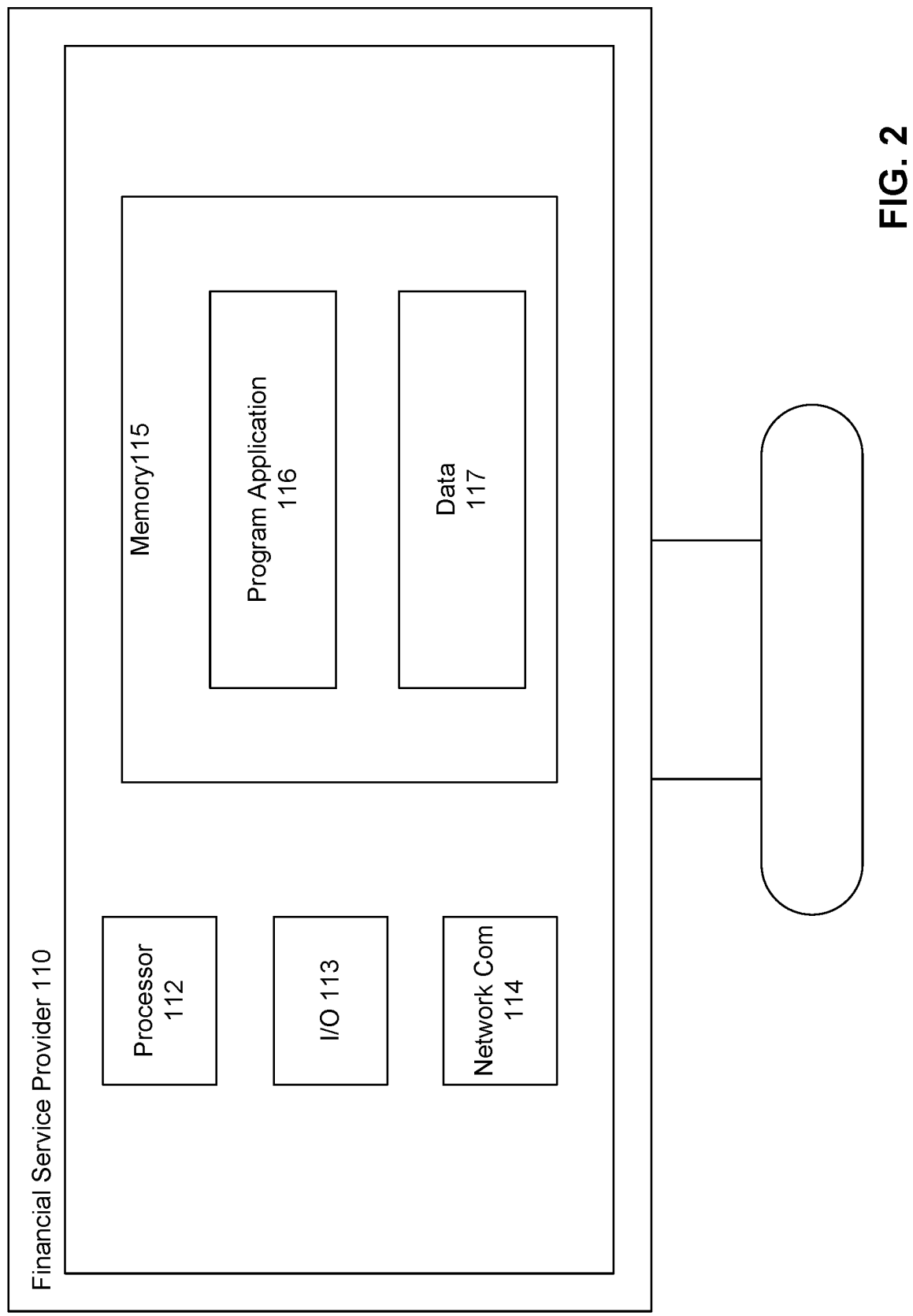
FIG. 2 is a block diagram of an exemplary financial service provider ("FSP") system 110, consistent with disclosed embodiments

FIG. 2 shows a diagram of an exemplary financial service provider ("FSP") 110, consistent with disclosed embodiments. As illustrated in FIG. 2, FSP 110 may include at least one processor 112, input/output ("I/O") device 113, network communication ("com") device 114, and/or memory 115. Processor 112 may include one or more known processing devices, for example, a microprocessor from the Pentium™ family manufactured by Intel™ or the Turion™ family manufactured by AMD™. Processor 112 may constitute a single core or multiple core processor that executes parallel processes simultaneously. For example, processor 112 may be a single core processor configured with virtual processing technologies. In certain embodiments, processor 112 may use logical processors to simultaneously execute and control multiple processes. Processor 112 may implement virtual machine technologies, or other known technologies to provide the ability to execute, control, run manipulate, store, etc. multiple software processes, applications, programs, etc. In another embodiment, processor 112 may include a multiple-core processor arrangement (e.g., dual, quad core, etc.) configured to provide parallel processing functionalities to allow FSP 110 to execute multiple processes simultaneously. One of ordinary skill in the art would understand that other types of processor arrangements could be implemented that provide for the capabilities disclosed herein.

I/O devices 113 may include one or more devices configured to allow data to be received and/or transmitted by FSP 110. I/O devices 113 may include one or more digital and/or analog devices that allow FSP 110 to communicate with other machines, devices, and systems, such as other components and devices of system 100. For example, I/O devices 113 may include a screen for displaying messages to a financial service provider employee. I/O devices 113 may also include one or more digital and/or analog devices that allow an employee of FSP 110 to interact with system 100. For example, such devices may include a touch-sensitive area, keyboard, buttons, or microphones. I/O devices 113 may also include other components known in the art for interacting with a user. I/O components 312 may include components, for example, buttons, switches, speakers, microphones, cameras, styluses, or touchscreen panels. I/O devices 113 may also include one or more hardware/software components for communicating with other components of system 100. For example, I/O devices 113 may include a wired network adapter, a wireless network adapter, a cellular network adapter, or the like. Such network components enable FSP 110 to communicate with other devices of system 100 to send and receive data.

Network Com 114 may include one or more components capable of communicating with network 140. Examples include an antenna wirelessly communicating with network 140 via cellular or Wi-Fi protocols. Although communication between FSP 110 and network 140 has been described as wireless communication, such communication could also occur using wired communication via, for example, an Ethernet terminal (not shown).

Memory 115 may be a volatile or non-volatile, magnetic, semiconductor, tape, optical, removable, non-removable, or other type of storage device or tangible (i.e., non-transitory) computer-readable medium that may store one or more program applications 116 and/or data 117. Data 117 may include, for example, loan deal terms, loan deal structure components, stipulations, applicant documents, third party documents, etc.

Program application 116 may include operating systems that perform known operating system functions when executed by one or more processors. By way of example, the operating systems may include one or more of Microsoft Windows™, Unix™, Linux™, Apple™, or Android™ operating systems, Personal Digital Assistant (PDA) type operating systems, such as Microsoft CE™, or other types of operating systems. Accordingly, disclosed embodiments may operate and function with computer systems running any type of operating system. FSP 110 may also include communication software that, when executed by processor 112, may provide communications with network 140. Such software may include, for example, Web browser software, tablet, or smart hand held device networking software, etc.

Program application 116 may include an app that performs the functions described herein for verifying loan applicant stipulations. For instance, program application 116 may include a FSP business model app that determines loan application contract terms and deal components. This business model app may further determine the investment risk for FSP based on the applicant's data and the determined deal components and contract terms. In some embodiments, program application 116 may include an income verification app that performs one or more functions illustrated in FIGS. 3A-E, and 4-6.

FSP 110 may also store in memory 115 data 117 relevant to the examples described herein for system 100, such as data relevant to funding a loan application. Data 117 may be further associated with information for a particular applicant (i.e. user) or a particular user device.

In certain embodiments, FSP 110, user device 120, and/or third party server 130 may include a power supply, such as a battery (not shown), configured to provide electrical power to FSP 110, user device 120, and/or third party server 130, respectively.

FIGS. 3A-E illustrate flowcharts of an exemplary method that may be performed by system 100 to verify an income for applicant. At step 300 of FIG. 3A, FSP 110 may internally approve a loan application received from applicant via, for example, user device 120. Additionally, FSP 110 may determine the deal structure components, and the deal risk; and based on the determined deal structure components, and deal risk, FSP 110 may further determine that the loan funding requires a stipulation, and if so, FSP 110 may further add the stipulation to the loan application. In some embodiments, the stipulation may include, for example, documentation verifying applicant's stated income. And in some embodiments, an added stipulation on an approved loan application may further prevent additional processing, communication of the approved loan to the applicant, or drafting of the loan contract.

At step 310, FSP 110 may request documentation verifying applicant's stated income. FSP 110 may request this documentation from the applicant or from a third party. Applicant may provide the stipulation documentation through user device 120, or a third party may provide the stipulation documentation through third party server 130. A third party may include a verification service such as TALX, Equifax, Experian, etc. FSP 110 may receive the income verification data from the application or from a third party.

At step 320, FSP 110 may determine whether the verified income, received for example in step 310, is within a predetermined threshold of the stated income. The predetermined threshold may equal the stated income, it may exceed the stated income, or it may be below the stated income. Additionally, the threshold may be a combination, for example, the threshold may include any income above 90% of the stated income. And, in some embodiments, FSP 110 may determine whether the verified income received is sufficient for the approved loan to proceed to finalizing a loan contract through a loan deal program application. In determining the sufficiency of the verified income, FSP 110 may consider when and/or whether the applicant is self-employed, has a job of less than six months duration, etc. If the verified income is within the predetermined threshold then FSP 110 progresses to step 330.

Figure 3A:
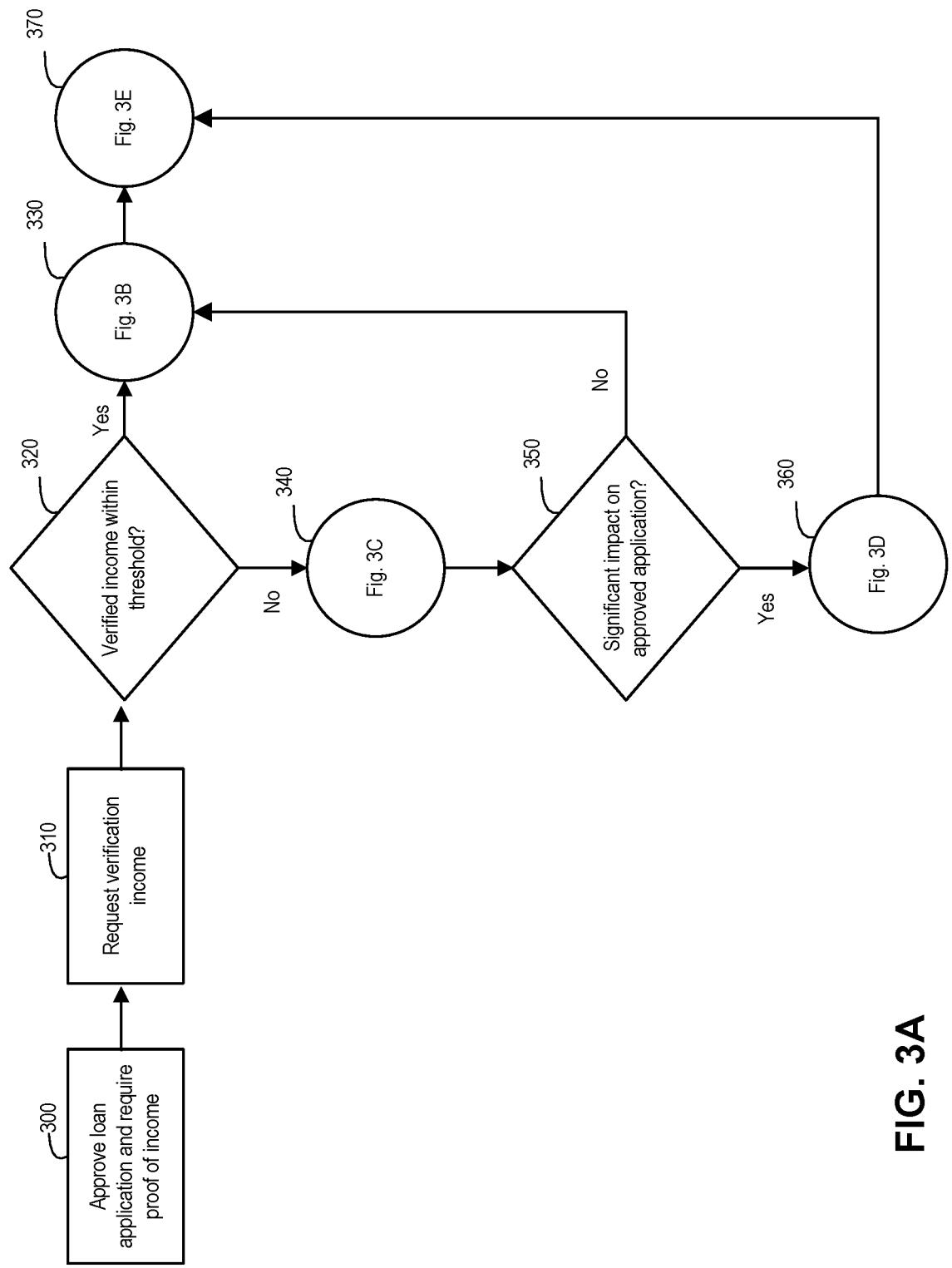
FIG. 3A is a flowchart of an exemplary method that may be performed by system 100 to verify an income for an applicant.
Figure 3E:
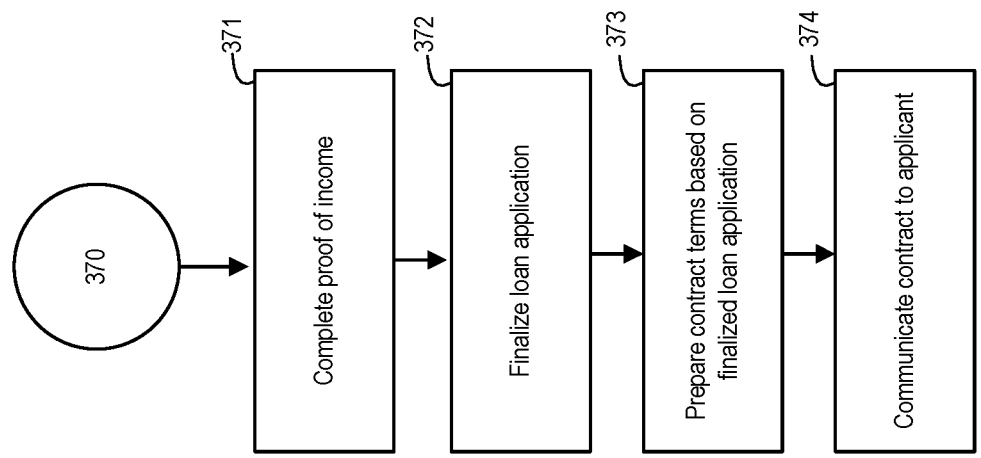
FIG. 3E is a flowchart of still another exemplary method that may be performed by system 100 to verify the income for the applicant.
Figure 3D:
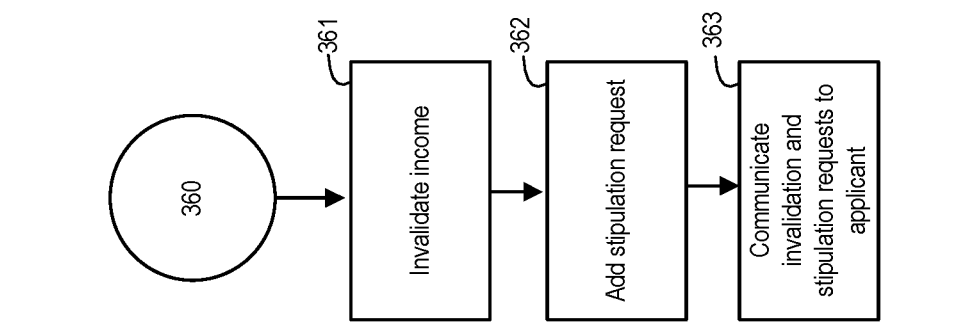
FIG. 3D is a flowchart of another exemplary method that may be performed by system 100 to verify the income for the applicant.
Figure 3C:
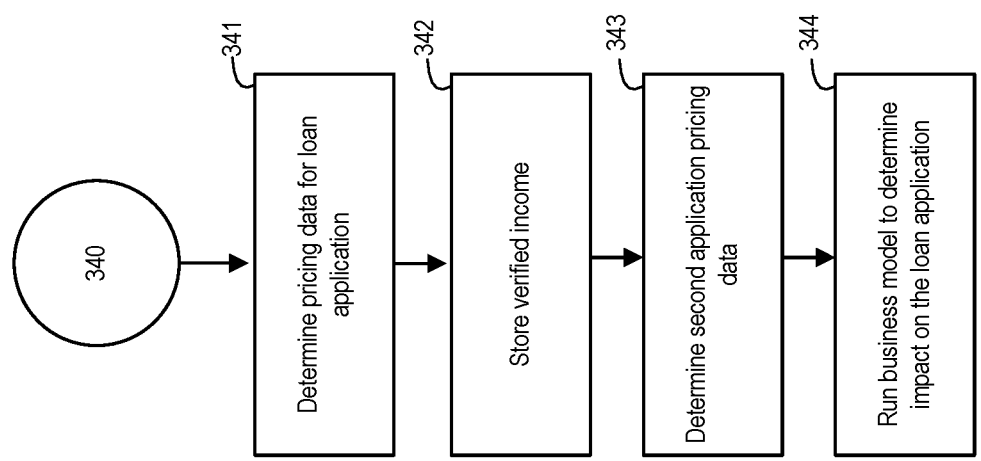
FIG. 3C is a flowchart of yet another exemplary method that may be performed by system 100 to verify the income for the applicant.
Figure 3B:
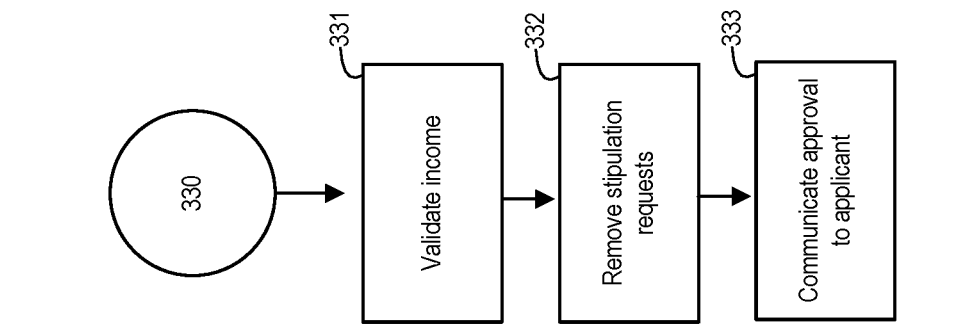
FIG. 3B is a flowchart of another exemplary method that may be performed by system 100 to verify the income for the applicant.

Step 330 may comprise of steps described in FIG. 3B. At step 331 of FIG. 3B, FSP 110 internally validates receipt of the requested income data from step 310. For instance, the requested documentation from step 310 may include data verifying applicant's stated income and it may include additional data such as income data described herein. FSP 110 may further validate the requested income data by processing the received documents and receiving the data within those documents. Additionally, in some embodiments, FSP 110 may indicate on the approved loan application that the income is validated. Further, at step 332, FSP 110 removes the stipulation request for the approved loan internally indicating that the approved loan may progress with the remainder of the loan contract and funding process. As such, at step 333, FSP 110 communicates approval of the requested income data from step 313 to the applicant through the various communication processes described herein. For instance, FSP 110 may communicate directly to the applicant by network com 114 and user device 120. The communication may be in the form of a phone call, voice message, text message, or program application interface.

Returning to FIG. 3A, if the verified income is not within the predetermined threshold then the method proceeds to step 340.

Step 340 may comprise one or more steps illustrated in FIG. 3C. At step 341 of FIG. 3C, FSP 110 may determine pricing data for the loan application. Pricing data may include, for example, the loan deal structure components based on the applicant's stated income. In some embodiments, FSP 110 may further determine pricing data from details such as APR, book value, information on front and backend-included products or features, title and fees, etc. Additionally, FSP 110 may run a deal program application that factors the received deal structure components and income data, and outputs the resulting pricing data. FSP 110 further, at step 342, stores the received third party verified income from step 310. And, at step 343, much like step 341, FSP 110 determine second application pricing data based on the third party verified income (whereas step 341 is based on the stated income). At step 344, FSP 110 may run a business model app that may determines an impact of a difference between the stated income and verified income for the loan deal structure components by comparing the first pricing data based on the stated income with the second pricing data based on the verified income. In some embodiments, in step 344, FSP 110 may also recalculate the deal risk based on the stated and verified incomes, using the business model app. In some embodiments, after completion of step 344, the method may proceed to step 350.

Returning to FIG. 3A, at step 350, FSP 110 may determine whether a difference between applicant's stated income and the verified income indicates a significant impact on the approved loan application's deal structure components and risk assessment. In some embodiments, FSP 110 may determine that deal structure components, such as APR, amount to finance (ATF), GAP, warranty, book value, etc., effect the approved loan application. In some embodiments, FSP 110 may determine that the deal structure components require adjustment when the difference between stated income and verified income is significant. See Discussion of FIG. 4 below. Otherwise, when the impact on the deal structure components is not significant, the method may return to, for example, step 331 of FIG. 3B. When the impact on the deal structure components is significant, however, the method may proceed to step 360.

Step 360 may comprise of steps described in FIG. 3D. At step 361 of FIG. 3D, FSP 110 may internally invalidate receipt of the requested income data from step 310. For instance, the requested documentation from step 310 may include data allegedly verifying applicant's stated income and it may include additional data such as income data described herein. FSP 110 may further invalidate the requested income data by processing the received documents and receiving the data within those documents and determining the stated income does not comply with the data within the received documents. Additionally, FSP 110 may indicate on the approved loan application that the income is not validated. Further, at step 362, FSP 110 may include an additional stipulation on the approved loan application prompting a request for necessary documents. The additional stipulation request may be for a second document validating the stated income. Or, in some embodiments, the received income data from the first stipulation may prompt a second stipulation document request regarding applicant's credit score or assets. In some embodiments, the additional stipulation may be an internal FSP 110 indicator on the loan application indicating required additional documentation. At step 363, FSP 110 may communicate the invalidation of the requested income data from step 310 to the applicant through the various communication processes described herein. For instance, FSP 110 may communicate directly to the applicant by network com 114 and user device 120. The communication may be in the form of a phone call, voice message, text message, or program application interface. Additionally, at step 363, FSP 110 may further request from the applicant or a third party the second stipulation (i.e. a second document with income data). For example, FSP 110 may include an indication (e.g. a digital flag or other information) indicating that a second stipulation may be required from the applicant. Further, at step 363, FSP 110 may receive the second income data from the applicant and/or third party.

Returning to FIG. 3A, the method may proceed to step 370. Step 370 may comprise steps illustrated in FIG. 3E. At step 371 of FIG. 3E, FSP 110 completes the proof of income process for the internally approved loan. At step 372, FSP 110 further finalizes the loan application by finalizing the deal structure components. At step 373, based on the received stipulated income data from steps 310 and 363, and the finalized deal structure components from step 372, FSP 110 prepares the deal terms. In some embodiments, step 373 may be performed by a business model application as discussed above. And at step 374, the FSP 110 communicates the loan deal terms to the applicant.

Figure 4:
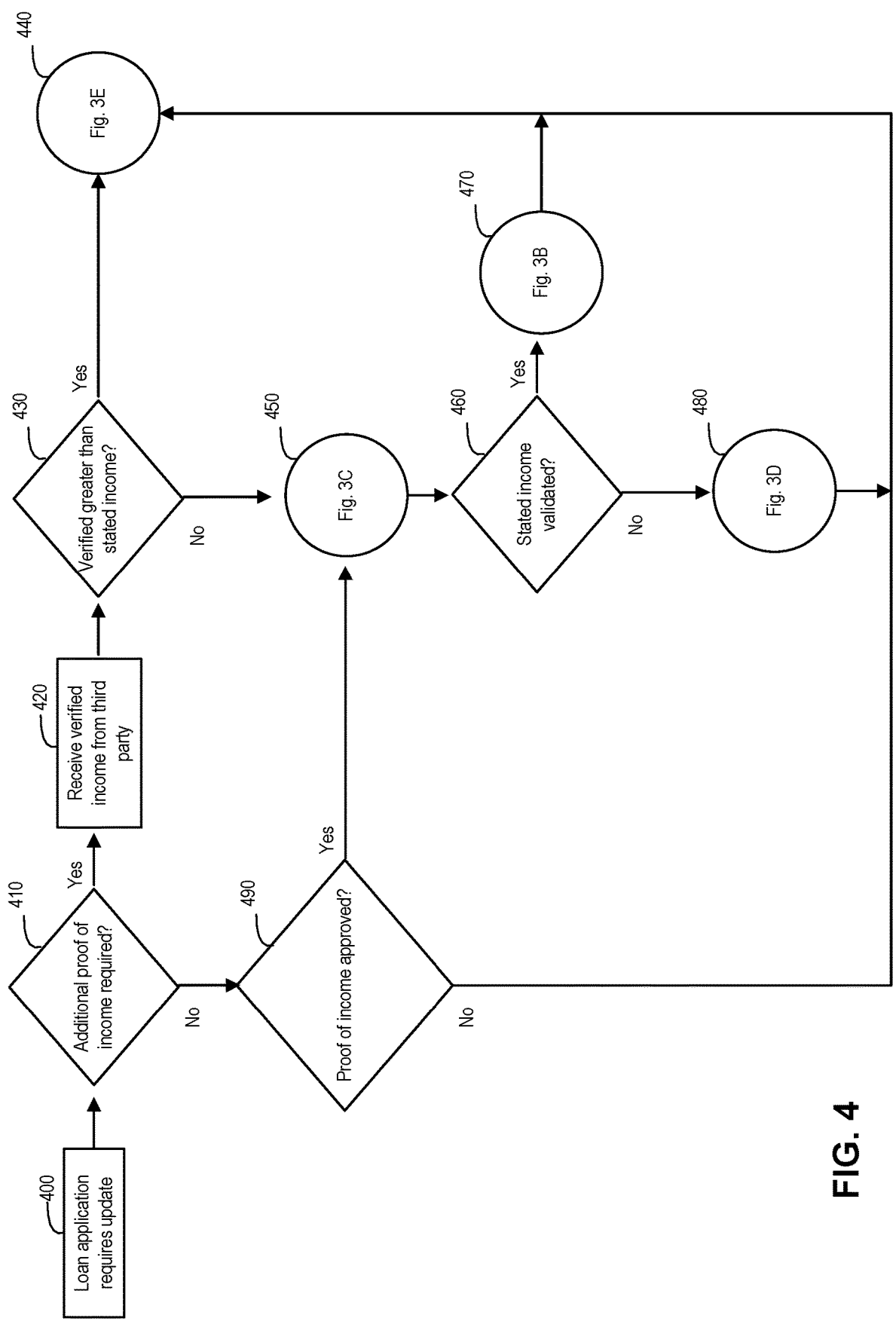
FIG. 4 is a flowchart of an exemplary method that may be performed by system 100 to determine whether to update the loan application deal structure components based on verified stipulations.

FIG. 4 is a flowchart of an exemplary method that may be performed by system 100 to determine whether to update the loan application deal structure components based on verified stipulations. In particular, FIG. 4 illustrates system 100 with respect to income stipulations, but it may be further understood by those skilled in the art that the same methods may be used for other stipulations discussed herein.

At step 400, FSP 110 may determine whether a loan application it is processing for funding requires an update to the deal structure components or deal terms. The loan application itself may contain deal structure components as well as applicant provided documents and data such as stated income. In some embodiments, FSP 110 may determine the loan application requires updating based on a business model program application output (e.g., deal program application), for example, based on the deal risk factors changing in response to the market. Alternatively, the applicant information may change or the loan deal structure components may themselves be updated. In some embodiments, FSP 110 may fail to validate deal stipulations as discussed above for FIGS. 3A-E prompting revisions to the original deal structure components.

At step 410, FSP 110 may determine whether the loan application requires additional proof of applicant's income. For instance, documents submitted with the original loan application may include income data indicating that applicant's stated income is correct. Consequently, further proof of income may not be required. But, in some embodiments, FSP 110 may determine that the type of loan, the deal structure components, or the determined deal risk require proof of applicant's income (stated or otherwise), and at step 420 FSP 110 may request and receive verified income data from a third party. FSP 110 may receive the verified income data via network 140 from third party server 130, or alternatively, FSP 110 may receive the verified income data from third party server 130, routed through user device 120 by network 140. FSP 110 may send a request to a third party providing applicant's stated income and provided information necessary for third party to verify the income. In some embodiments, FSP 110 may provide third party with documents and the third party may provide additional documents in return. Or alternatively, the documents may be routed through user device 120.

At step 430, FSP 110 may determine whether the received verified income from step 420 is greater than applicant's stated income. When FSP 110 determines that applicant's verified income is greater than their stated income, FSP 110 may proceed to step 440.

Step 440 may comprise the steps described FIG. 3E. When FSP 110 determines that applicant's verified income is not greater than the stated income, FSP 110 may proceed from step 430 to step 450. Step 450 may include steps discussed above with respect to, for example, FIG. 3C.

After the steps described in FIG. 3C, and returning to FIG. 4 at step 460, FSP 110 may determine whether the stated income can be validated. For instance, in some embodiments there may be additional stipulations or documents, other than the documents reviewed by the third party in step 420, that FSP 110 has not yet reviewed and that may validate the stated income. Some documents may provide proof of applicant's financial situation to provide further validation of the stated income. When FSP 110 is able to validate stated income, FSP 110 may proceed from step 460 to step 470, which may include steps discussed above with respect to, for example, FIG. 3B.

After completing the steps described in FIG. 3B, FSP 110 may proceed to step 440. However, when FSP 110 cannot validate the stated income in step 460, FSP 110 may proceed to step 480, which may include steps discussed above with respect to, for example, FIG. 3D. After completing the steps described in FIG. 3D, FSP 110 may proceed to step 440, which may include steps discussed above with respect to, for example, FIG. 3E.

Returning to FIG. 4, when FSP 110 determines that the loan application does not require additional proof of income in step 410, FSP 110 may proceed to step 490. In step 490, FSP 110 may further determine whether the proof of income was approved by comparison to associated third party verified income. For instance, in some embodiments, the FSP 110 may determine that the proof of income, and associated documents, are satisfactory and comply with industry standards such that the income data is reliable. If the proof of income for the loan application was approved with third party verified income, FSP 110 may proceed from step 490 to step 450. Otherwise, if the proof of income for the loan application was not approved by third party verified income, FSP 110 may proceed from step 490 to step 440.

Figure 5:
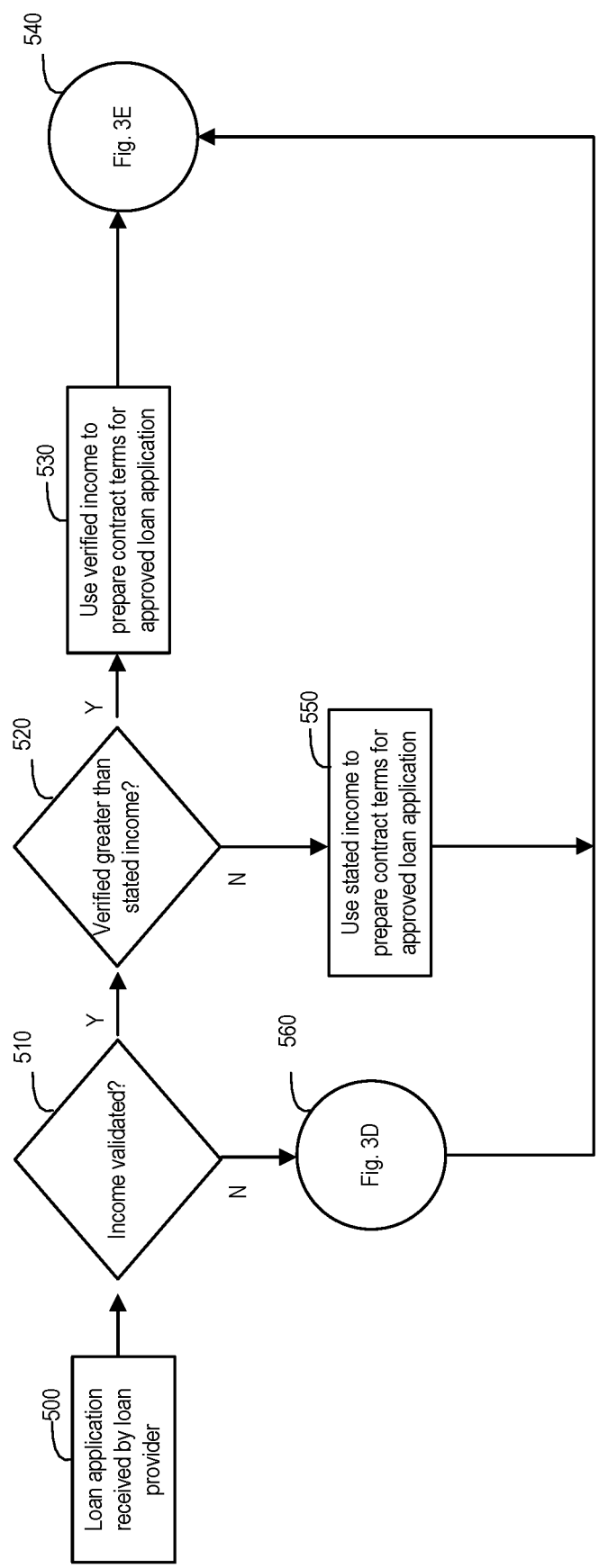
FIG. 5 is a flowchart of an exemplary method that may be performed by system 100 preparing loan deal terms for an internally approved loan application based on the proof of income and income verification.

FIG. 5 is a flowchart of an exemplary method for system 100 preparing loan deal terms for an internally approved loan application based on the proof of income and income verification. Further, the exemplary method of FIG. 5 may be automated by FSP 110. In particular, FIG. 5 depicts system 100 with respect to income stipulations, but it will be further understood by those skilled in the art that the same methods may be used for other stipulations discussed herein.

At step 500, FSP 110 may receive a loan application for an applicant. FSP 110 may receive the loan application directly from applicant, from user device 120, or via network 140. The loan application itself may contain deal structure components as well as applicant provided documents and data, such as stated income. Internally, FSP 110 may further approve the loan application and seek to proceed with creating a loan contract with applicant.

At step 510, FSP 110 may determine whether the applicant's stated income is validated by received stipulations. As discussed herein, the stipulations may further include verified income data from the applicant or third party sources. When FSP 110 determines that the stated income is validated by received stipulation documents, FSP 110 may proceed to step 520. At step 520, FSP 110 may determine whether the received verified income is greater than the stated income. When FSP 110 determines that the verified income is greater than the stated income, at step 530 FSP 110 may prepare a loan contract with deal terms based on the internally approved loan and the verified income. FSP 110 may further use a business model program application to adjust the deal components and calculate the deal terms based on the verified income. FSP 110 may proceed to step 540, wherein step 540 may include steps discussed above with respect to, for example, FIG. 3E.

However, at step 520, when FSP 110 determines that the verified income is not greater than the stated income, FSP 110 may proceed to step 550. At step 550, much like step 530, FSP 110 may prepare a loan contract with deal terms based on the internally approved loan and the stated income. FSP 110 may further use a business model app to adjust the deal components and calculate the deal terms based on the stated income. FSP 110 may proceed to step 540.

And, at step 510, when FSP 110 determines that the income is not validated, FSP 110 may proceed to step 560, which may include steps discussed above with respect to, for example, FIG. 3D. After completing the steps of FIG. 3D, FSP 110 may proceed to step 540.

Figure 6:
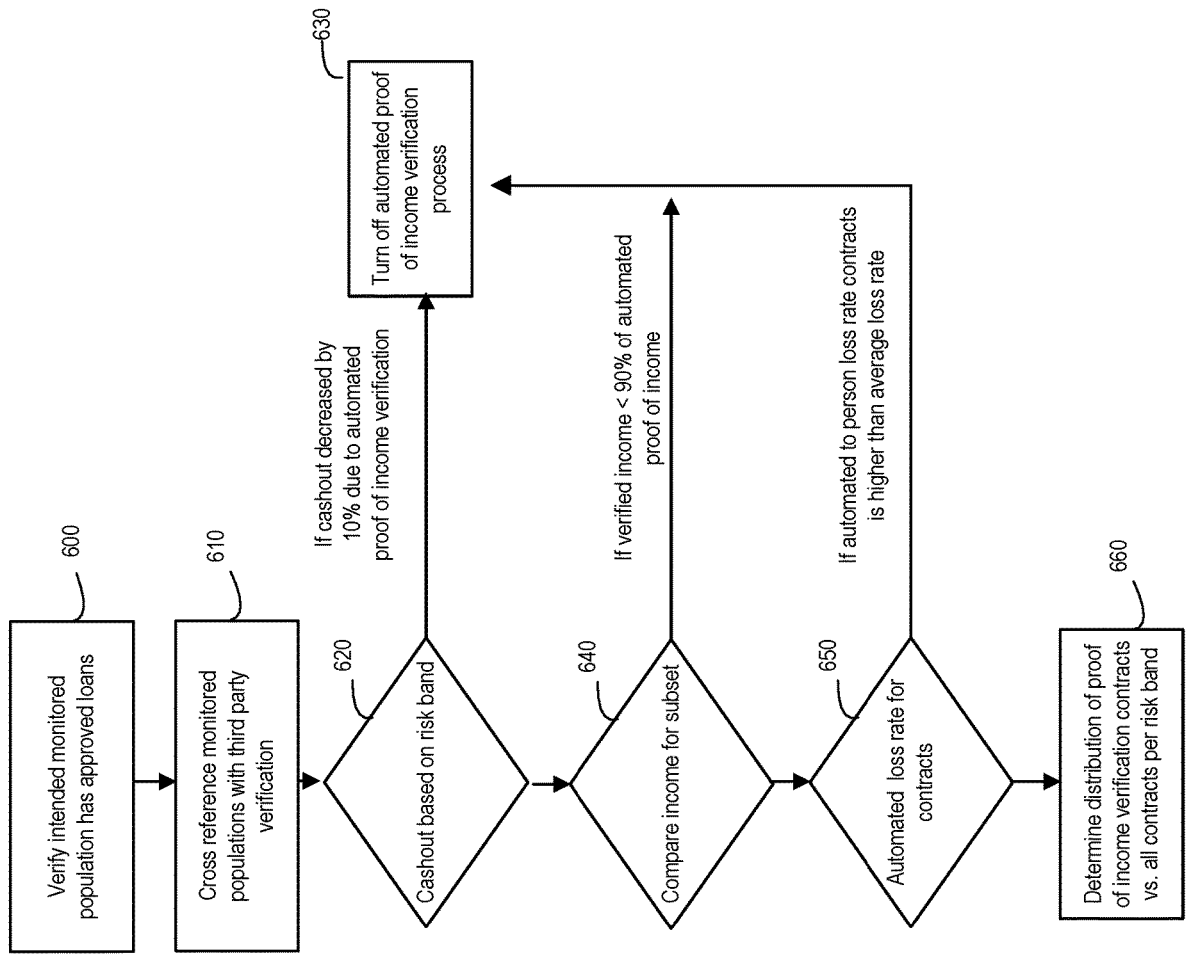
FIG. 6 is a flowchart of an exemplary method that may be performed by system 100 for monitoring automatic loan application approvals.

FIG. 6 is a flowchart of an exemplary method for system 100 for monitoring automatic loan application approvals. The exemplary method may be utilized by FSP 110 to monitor automatic loan application approvals for several applicants. The exemplary method may automate approvals of loan applications based on verified stipulated documents. Additionally, the methods described may be further implemented by a business model program application. In particular, FIG. 6 depicts system 100 with respect to income stipulations (and the comparison between stated income versus verified income), but it will be further understood by those skilled in the art that the same methods may be used for other stipulations discussed herein.

At step 600, FSP 110 may verify that the intended population of applicants and their associated monitored loan applications are internally approved. For instance, in some embodiments, each monitored application may be in some step described in one or more of, for example, FIGS. 3A-E and FIG. 5. FSP 110 may internally approve each monitored applicant's loan application received. Additionally, FSP 110 may further calculate the deal structure components, and the deal risks for each respective application; and based on the deal structure components, and deal risks, FSP 110 may further determine that the monitored loans require respective stipulations, in particular, documentation verifying each applicant's stated income.

At step 610, FSP 110 may cross reference the monitored approved loans, and in particular, the stated incomes with respective third party verification. In some embodiments, for example, step 310 of FIG. 3A, FSP 110 may request documentation verifying applicants' stated income for each monitored loan application. FSP 110 may request this documentation from the applicants or from third parties. Applicants may provide the income verification stipulation documentation through user devices 120, or the third parties may provide the stipulation documentation through third party servers 130. Third parties may include verification services such as TALX, Equifax, Experian, etc. And FSP 110 may receive the income verification data from the third parties or the applicants.

At step 620, FSP 110 may analyze the financial cashout for each risk band. Each applicant and their respective loan application may be analyzed for potential risks. And all of the monitored loan applications may be grouped together by risk bands, where riskier loan investments for the FSP 110 may be grouped together and safer loan investments may likewise be grouped together. The FSP 110 financial cashout may be an additional analysis wherein FSP 110 may compute the actual, or anticipated, money amount loaned out to the population of applicants for the monitored applications. When the cashout decreases by 10% while the automated proof of income verification process described in, for example, FIG. 5 is on-going, at step 630 FSP 110 may cease the automated proof of income verification processes described in FIG. 5 for the monitored applications. It will be further understood by one skilled in the art that while FIG. 6 depicts 10%, the actual cashout threshold may be higher or lower than 10%.

Otherwise, FSP 110 may proceed to step 640 wherein FSP 110 further may review a sub-set of the applicant population and monitored applications. This review may be random or targeted based on the risk bands described in step 620. Alternatively, the subset may be based on geographic factors based on the respective applicants' locations. In some embodiments, the subset may be based on a selected applicant's progress through the application process. For instance, the group may consist of only applicants with offered, yet unaccepted, loan contracts. When the subset population has third party verified income less than 90% of the automated validated proof of income (i.e. the validated stated income), at step 630 FSP 110 may cease the automated proof of income verification processes described in FIG. 5 for the entire monitored applications. It will be further understood by one skilled in the art that while FIG. 6 depicts 90% of the automated proof of income as the threshold, the threshold may higher or lower than 90%.

FSP 110 may proceed to step 650. At step 650, when the automated proof of income process yields less loan contract offers than the average contract offer for FSP 110, at step 630 FSP 110 may cease the automated proof of income verification processes described in FIG. 5 for the entire monitored population of applications.

Otherwise, FSP 110 may proceed to step 660. At step 660, FSP 110 may further analyze the monitored loan applications and may determine the distribution of proof of income verification loan contracts versus all loan contracts (monitored and non-monitored) grouped by risk bands. This analysis may be further used to alter the thresholds discussed in steps 620 and 640.

It will be further understood that when FSP 110 ceases the automated proof of income verification process at step 630 the particular monitored applications may be finalized by an employee of FSP 110.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Generating computer programs based on the written description and methods of this specification may be within the skill of a software developer. The various programs or program modules may be created using a variety of programming techniques. For example, program sections or program modules may be designed by means of JavaScript, Scala, python, Java, C, C++, assembly language, or any such programming languages, as well as data encoding languages (such as XML, JSON, etc.), query languages (such as SQL), presentation-related languages (such as HTML, CSS etc.) and data transformation language (such as XSL). One or more of such software sections or modules may be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for approving an application for a loan and automatically validating an income of a loan applicant, comprising:
  one or more memory devices storing instructions; and
  one or more processors configured to execute the instructions to perform operations comprising:
    defining a data structure comprising a plurality of pre-determined risk bands, wherein each of the risk bands comprises a categorization or grouping of loans based on associated risk factors, deal components, or pricing data for that group of loans;
    receiving, by a financial services provider server, the application for a loan from an applicant computing device, the application including first income data specifying a first income stated by an applicant;
    storing, at the financial service provider server, the loan application of the applicant;
    preliminarily approving the application based on the first income;
    appending to the stored loan application a digital indicator associated with a stipulation required by the financial service provider in order to validate the income of the applicant;
    requesting, from the applicant, second income data comprising documentation, to be provided by the applicant computing device, supporting the first income;
    receiving, at the financial service provider server, the second income data, the second income data specifying a second income;
    requesting, from a third party server, third income data verified by the third party;
    receiving, at the financial service provider server, the third income data verified by the third party, the third income data specifying a third income;
    storing the first, second, and third incomes at the financial service provider server and associating the incomes with the applicant's loan application;
    comparing, by the financial services provider server, the first, the second, and the third;
    determining whether the preliminarily approved application should be modified based on at least the first, second, and third incomes, by:
      determining respective first and second risk bands based on the respective first income stated by the applicant and the third income verified by the third party;
      comparing the first and second risk bands;
      when the second risk band is at least the same or less risky than the first risk band:
        validating the second income supporting the first income or the third income verified by the third party, and
        automatically confirming approval of the application for the loan; and
      when the second risk band is more risky than the first risk band:
        invalidating the second income supporting the first income or the third income verified by the third party,
        setting the digital indicator associated with the application to require an additional stipulation;
        automatically, based on the additional stipulation, requesting a fourth income data supporting the first income, wherein the fourth income data comprises additional income documentation to be provided by an applicant computing device;
        determining a third risk band based on received fourth income data supporting the first income, the fourth income data including a fourth income;
        validating the fourth income if the third risk band is the same or less risky than the first risk band; and
        modifying the application for the loan based on the risk band analysis and the validated fourth income; and
      notifying, via an indication to an applicant computing device, the applicant of the confirmation or the modification.

2. The system of claim 1, wherein determining whether the preliminarily approved application should be modified comprises sending the preliminarily approved application to the applicant when the third income is greater than the first income.

3. The system of claim 1, wherein if the fourth income is less than a predetermined portion of the third income, modifying the approved application by changing a deal parameter.

4. The system of claim 3, wherein the deal parameter comprises at least one of a loan interest rate, a loan duration, or a monthly payment amount.

5. The system of claim 4, wherein the approving the preliminarily application comprises completing an agreement with a loan provider based on the first income.

6. The system of claim 5, further comprising offering the modified approved application to the applicant.

7. The system of claim 1, wherein receiving the application for a loan comprises receiving the application for a real estate property.

8. A device for approving an application for a loan and automatically validating an income of a loan applicant, comprising:
  one or more memory devices storing instructions; and
  one or more processors configured to execute the instructions to perform operations comprising:
    defining a data structure comprising a plurality of pre-determined risk bands, wherein each of the risk bands comprises a categorization or grouping of loans based on associated risk factors, deal components, or pricing data for that group of loans;
    receiving, by a financial services provider server, the application for a loan from an applicant computing device, the application including first income data specifying a first income stated by an applicant;
    storing, at the financial service provider server, the loan application of the applicant;
    preliminarily approving the application based on the first income;
    appending to the stored loan application a digital indicator associated with a stipulation required by the financial service provider in order to validate the income of the applicant;
    requesting, from the applicant, second income data comprising documentation, to be provided by the applicant computing device, supporting the first income;

receiving, at the financial service provider server, the second income data, the second income data specifying a second income;

requesting, from a third party server, third income data verified by the third party;

receiving, at the financial service provider server, the third income data verified by the third party, the third income data specifying a third income;

storing the first, second, and third incomes at the financial service provider server and associating the incomes with the applicant's loan application;

comparing, by the financial services provider server, the first, the second, and the third;

determining whether the preliminarily approved application should be modified based on at least the first, second, and third incomes, by:

determining respective first and second risk bands based on the respective first income stated by the applicant and the third income verified by the third party;

comparing the first and second risk bands;

when the second risk band is at least the same or less risky than the first risk band:

validating the second income supporting the first income or the third income verified by the third party, and automatically confirming approval of the application for the loan; and when the second risk band is more risky than the first risk band:

invalidating the second income supporting the first income or the third income verified by the third party, setting the digital indicator associated with the application to require an additional stipulation;

automatically, based on the additional stipulation, requesting a fourth income data supporting the first income, wherein the fourth income data comprises additional income documentation to be provided by an applicant computing device;

determining a third risk band based on received fourth income data supporting the first income, the fourth income data including a fourth income;

validating the fourth income if the third risk band is the same or less risky than the first risk band; and modifying the application for the loan based on the risk band analysis and the validated fourth income; and notifying, via an indication to an applicant computing device, the applicant of the confirmation or the modification.

9. The device of claim 8, wherein determining whether the preliminarily approved application should be modified comprises sending the preliminarily approved application to the applicant when the third income is greater than the first income.

10. The device of claim 8, wherein if the fourth income is less than a predetermined portion of the third income, modifying the approved application by changing a deal parameter.

11. The device of claim 10, wherein the deal parameter comprises at least one of a loan interest rate, a loan duration, or a monthly payment amount.

12. The device of claim 11, wherein the approving the preliminarily application comprises completing an agreement with a loan provider based on the first income.

13. The device of claim 12, further comprising offering the modified approved application to the applicant.

14. The device of claim 8, wherein receiving the application for a loan comprises receiving the application for a real estate property.

\* \* \* \* \*